(12) United States Patent
Dang et al.

(10) Patent No.: US 11,578,163 B2
(45) Date of Patent: Feb. 14, 2023

(54) HYDROLYSIS-RESISTANT, $CO_2$-PERMEABLE BLOCK COPOLYMER

(71) Applicant: Arkema France, Colombes (FR)

(72) Inventors: Patrick Dang, Serquigny (FR); Quentin Pineau, Serquigny (FR); Inci Turan-Altuntas, Serquigny (FR)

(73) Assignee: ARKEMA FRANCE, Colombes (FR)

( * ) Notice: Subject to any disclaimer, the term of this patent is extended or adjusted under 35 U.S.C. 154(b) by 212 days.

(21) Appl. No.: 16/770,651

(22) PCT Filed: Dec. 7, 2018

(86) PCT No.: PCT/FR2018/053152
§ 371 (c)(1),
(2) Date: Jun. 8, 2020

(87) PCT Pub. No.: WO2019/110944
PCT Pub. Date: Jun. 13, 2019

(65) Prior Publication Data
US 2020/0299447 A1 Sep. 24, 2020

(30) Foreign Application Priority Data
Dec. 8, 2017 (FR) ..................................... 17.61830

(51) Int. Cl.
*C08F 293/00* (2006.01)
(52) U.S. Cl.
CPC .................................. *C08F 293/00* (2013.01)
(58) Field of Classification Search
CPC ..................................................... C08F 293/00
See application file for complete search history.

(56) References Cited

U.S. PATENT DOCUMENTS

| | | |
|---|---|---|
| 5,331,061 A | 7/1994 | Liedloff |
| 5,574,128 A | 11/1996 | Judas et al. |
| 2004/0242774 A1 | 12/2004 | Fujimura et al. |

FOREIGN PATENT DOCUMENTS

| | | |
|---|---|---|
| CN | 1103873 A | 6/1995 |
| JP | 2004352789 A | 12/2004 |

OTHER PUBLICATIONS

Office Action (the First Office Action) dated Aug. 15, 2022 by the China National Intellectual Property Administration in corresponding Chinese Patent Application No. 201880079261.3, and an English Translation of the Office Action. (20 pages).

*Primary Examiner* — Mark S Kaucher
(74) *Attorney, Agent, or Firm* — Buchanan Ingersoll & Rooney P.C.

(57) ABSTRACT

The invention relates to a block copolymer comprising at least one rigid polyamide block and at least one flexible block, characterized in that the flexible block has an $NH_2$/OH ratio of concentrations of amine chain ends to alcohol chain ends which is within the range from 30 to 150, said concentrations being measured by $^1$H NMR ($TF_{anh.}$/$CD_2Cl_2^3$). The invention also relates to the use of a flexible block for manufacturing a copolymer containing polyamide blocks and flexible blocks that is both hydrolysis-resistant and $CO_2$-permeable, with a permeability to $CO_2$ of at least 10 000 cm$^3$/m$^2$/24 h/atm for a 25 μm film of said copolymer, characterized in that said flexible block has a ratio of amine chain ends to acid chain ends which is within the range from 30 to 150.

13 Claims, 2 Drawing Sheets

HYDROLYSIS-RESISTANT, CO₂-PERMEABLE BLOCK COPOLYMER

This application claims benefit, under U.S.C. § 119 or § 365 of PCT Application Number PCT/FR2018/053152, filed Dec. 7, 2018, and French Patent Application Number FR 17.61830 filed Dec. 8, 2017, these documents being incorporated herein by reference.

FIELD OF THE INVENTION

The present invention relates to a novel copolymer containing rigid polyamide PA blocks and flexible blocks, such as polyether PE, enabling the manufacture of materials that are both hydrolysis-resistant and $CO_2$-permeable.

The present invention also relates to a process for manufacturing such a copolymer and to the use thereof notably in the sports industry, in the oil and gas industry, notably in offshore applications, in the motor vehicle industry, in transmission belts, notably for the wood industry, the textile industry, in packaging, notably food packaging, and useful in all applications requiring a material that is both hydrolysis-resistant and $CO_2$-permeable.

TECHNICAL BACKGROUND

In the last decade, copolymers containing polyamide PA blocks and polyether PE blocks (abbreviated as PEBA copolymer in the present description), notably those sold by the company Arkema under the brand name Pebax®, have gradually asserted themselves in the field of high-quality shoes, in particular sports shoes, by virtue of their mechanical properties and notably their exceptional elastic return property.

Other typical applications of PEBAs are found in the motor vehicle sector and more generally in industry, notably conveyor belts and transmission belts, or alternatively in the textile sector with waterproof breathable films. Pebax® products offer an excellent compromise in terms of properties: the lightest thermoplastic elastomer, broad hardness range, the widest flexibility range, excellent dynamic properties and low formation of heat, tear strength and impact strength, flexibility fatigue resistance, and maintenance of the mechanical properties even under extreme conditions, and notably at temperatures ranging from −40° C. to +80° C.

Unfortunately, for some of these applications, the resistance to hydrolysis and the permeability to $CO_2$ of the prior art systems is far from being optimal. Thus, certain PEBA substrates degrade rapidly under the effect of hydrolysis, which is notably manifested by a loss in inherent viscosity typically of at least 75% and a rapid decrease in the elongation at break, for example becoming less than 15%, then it becomes impossible to perform tensile tests on the material, which breaks up.

The aim of the present invention is thus to provide a block copolymer that is hydrolysis-resistant while at the same time having a permeability to $CO_2$ of at least 10 000 cm³/m²/24 h/atm for a film 25 μm thick.

The aim of the present invention is also to provide a block copolymer that is readily extrudable even into large-diameter tubes, having an elongation at break of greater than 350% according to the standard ISO 527 1A: 2012, and a stable inherent viscosity, which does not decrease by more than 25% even when said copolymer is subjected to extreme hydrolysis conditions, for example at the bottom of the sea, or in a tropical or very humid climate.

The Applicant has now developed a novel type of block copolymer, which is particularly hydrolysis-resistant while at the same time being perfectly $CO_2$-permeable.

DESCRIPTION OF EMBODIMENTS OF THE INVENTION

Figure 1:
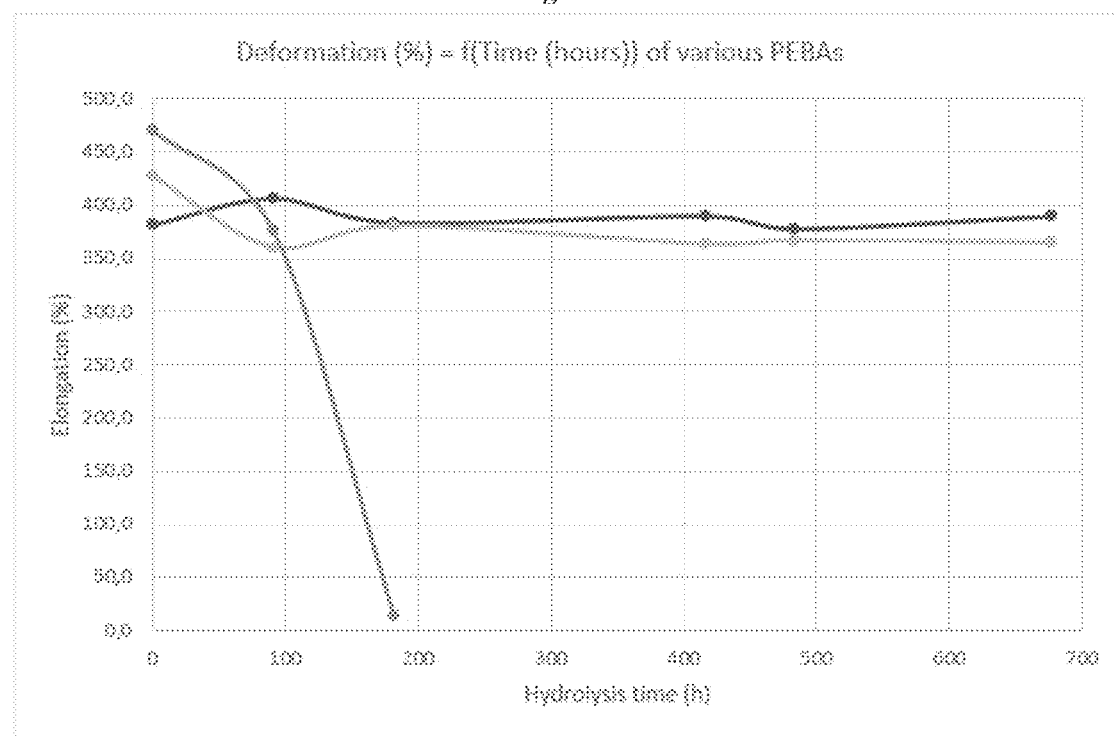
FIG. 1 shows the change in the elongation at break of these various PEBAs as a function of the hydrolysis time.

In the present description, it is pointed out that when reference is made to ranges, expressions of the type "ranging from . . . to . . . " or "including/comprising from . . . to . . . " include the limits of the range. Conversely, expressions of the type "between . . . and . . . " exclude the limits of the range. Unless otherwise mentioned, the percentages expressed are mass percentages. Unless otherwise mentioned, the parameters to which reference is made are measured at atmospheric pressure and at room temperature (20-25° C., generally 23° C.).

The invention is now described in detail and in a non-limiting manner in the description that follows.

One subject of the invention is thus a block copolymer comprising at least one rigid polyamide block and at least one flexible block, in particular a copolymer containing rigid polyamide blocks and flexible blocks, characterized in that the flexible block has an $NH_2/OH$ ratio of concentrations of amine chain ends to alcohol chain ends which is within the range from 30 to 150, said concentrations preferably being measured by $^1H$ NMR ($TF_{anh.}/CD_2Cl_2$) or ($TF_{anh.}/CD_2Cl_2^3$).

Advantageously, said $NH_2/OH$ ratio is within the range from 30 to 100, preferably from 30 to 80, preferably from 30 to 60.

The copolymer containing rigid polyamide PA blocks and flexible blocks thus defined according to the invention falls among the thermoplastic elastomer polymers. The term "thermoplastic elastomer polymer", abbreviated as "TPE", denotes a polymer which constitutes a polyphasic material having at least two transitions, namely a first transition at a temperature T1 (in general this is the glass transition temperature) and a second transition at a temperature T2 above T1 (in general this is the melting point). At a temperature below T1 the material is rigid, between T1 and T2 it has elastic behavior, and above T2 it is molten. Such a polymer combines the elastic behavior of materials of rubber type with the transformability of thermoplastics.

A polyamide-based thermoplastic elastomer (TPE-A) for the purposes of the invention, such as a PEBA, is a block copolymer comprising an alternating sequence of rigid or hard blocks (HB) and flexible or soft blocks (SB), according to the following general formula:

-[HB-SB]n- and in which:
HB or Hard Block or rigid block: represents a block comprising polyamide (homopolyamide or copolyamide) or a mixture of blocks comprising polyamide (homopolyamide or copolyamide), abbreviated independently hereinbelow as PA or HB block;
SB or Soft Block or flexible block: represents a block based on polyether (PE block), polydimethylsiloxane (PDMS block), polyolefin (PO block) and/or any other polymer with a low glass transition temperature, or mixtures thereof in the form of alternating, statistical or block copolymers. Preferably, SB is a block totally or partly based on polyether.

Advantageously, said flexible block comprises at least one polyether PE, preferably chosen from PTMG, PPG, PO3G and/or PEG, preferably at least one PPG.

n represents the number of repeating units in the unit -HB-SB- of said copolymer. n is within the range extending from 1 to 60, preferably from 5 to 30 or better still from 6 to 20.

For the purposes of the invention, the expression "low glass transition temperature" for a polymer included in the composition of an SB means a glass transition temperature Tg below 15° C., preferably below 0° C., preferably below −15° C., more preferably below −30° C. By way of example, said soft block may be based on PEG with a number-average molar mass equal to 1500 g/mol and a Tg of the order of −35° C. Said glass transition temperature Tg may also be below −50° C., notably in the case where said soft block is based on PTMG.

Copolyether block amides, also known as copolymers containing polyether blocks and polyamide blocks, abbreviated as "PEBA", result from the polycondensation of polyamide blocks bearing reactive ends with polyether blocks bearing reactive ends, such as, inter alia:

1) polyamide blocks bearing diamine chain ends with polyoxyalkylene blocks bearing dicarboxylic chain ends;

2) polyamide blocks bearing dicarboxylic chain ends with polyoxyalkylene blocks bearing diamine chain ends, obtained by cyanoethylation and hydrogenation of α,ω-dihydroxylated aliphatic polyoxyalkylene blocks, known as polyetherdiols;

3) polyamide blocks bearing dicarboxylic chain ends with polyetherdiols, the products obtained being, in this particular case, polyetheresteramides.

In the case of the present invention, preference is given to copolyether block amides resulting predominantly from the polycondensation type 2) above, such that the flexible block has an $NH_2$/OH ratio of concentrations of amine chain ends to alcohol chain ends of at least 30, and preferably within the range from 30 to 150.

The polyamide blocks bearing dicarboxylic chain ends originate, for example, from the condensation of polyamide precursors in the presence of a chain-limiting dicarboxylic acid. The polyamide blocks bearing diamine chain ends originate, for example, from the condensation of polyamide precursors in the presence of a chain-limiting diamine.

The number-average molar mass Mn of the polyamide blocks is between 400 and 20 000 g/mol and preferably between 500 and 10 000 g/mol.

The number-average molecular (or molar) mass is set by the content of chain limiter. It may be calculated according to the equation:

$$Mn=(nmonomer/nlimiter)*Mrepeating\ unit+Mlimiter$$

nmonomer=number of moles of monomer
nlimiter=number of moles of diacid in excess
Mrepeating unit=molar mass of the repeating unit
Mlimiter=molar mass of the diacid in excess The polymers containing polyamide blocks and polyether blocks may also comprise randomly distributed units.

Three types of polyamide blocks may advantageously be used.

According to a first type, the polyamide blocks originate from the condensation of a dicarboxylic acid, in particular those containing from 4 to 20 carbon atoms, preferably those containing from 6 to 18 carbon atoms, and of an aliphatic or aromatic diamine, in particular those containing from 2 to 20 carbon atoms, preferably those containing from 6 to 14 carbon atoms.

As examples of dicarboxylic acids, mention may be made of 1,4-cyclohexanedicarboxylic acid, butanedioic acid, adipic acid, azelaic acid, suberic acid, sebacic acid, dodecanedicarboxylic acid, octadecanedicarboxylic acid, terephthalic acid and isophthalic acid, but also dimerized fatty acids.

As examples of diamines, mention may be made of tetramethylenediamine, hexamethylenediamine, 1,10-decamethylenediamine, dodecamethylenediamine, trimethylhexamethylenediamine, the isomers of bis(4-aminocyclohexyl)methane (BACM), bis(3-methyl-4-aminocyclohexyl)methane (BMACM) and 2-2-bis(3-methyl-4-aminocyclohexyl)propane (BMACP), and para-aminodicyclohexylmethane (PACM), and isophoronediamine (IPDA), 2,6-bis(aminomethyl)norbornane (BAMN) and piperazine (Pip).

As regards the rigid polyamide block, the standard NF EN ISO 1874-1: 2011 defines a nomenclature for polyamides. In the present description, the term "monomer" should be taken as meaning "repeating unit". The case where a repeating unit of the polyamide consists of the combination of a diacid with a diamine is particular. It is considered that it is the combination of a diamine and of a diacid, that is to say the "diamine diacid", also called "XY", pair, in equimolar amount, which corresponds to the monomer. This is explained by the fact that, individually, the diacid or the diamine is only a structural unit, which is not enough by itself alone to polymerize.

Examples thereof are the blocks PA412, PA414, PA418, PA610, PA612, PA614, PA618, PA912, PA1010, PA1012, PA1014 and PA1018.

According to a second type, the polyamide blocks result from the condensation of one or more α,ω-aminocarboxylic acids and/or of one or more lactams containing from 6 to 12 carbon atoms in the presence of a dicarboxylic acid containing from 4 to 12 carbon atoms or of a diamine. As examples of lactams, mention may be made of caprolactam, oenantholactam and lauryllactam. As examples of α,ω-aminocarboxylic acids, mention may be made of aminocaproic acid, 7-aminoheptanoic acid, 11-aminoundecanoic acid and 12-aminododecanoic acid.

Advantageously, the polyamide blocks of the second type are made of polyamide-11, polyamide-12 or polyamide-6.

According to a third type, the polyamide blocks result from the condensation of at least one α,ω-aminocarboxylic acid (or a lactam), at least one diamine and at least one dicarboxylic acid.

In this case, the polyamide PA blocks are prepared by polycondensation:
of the linear aliphatic or aromatic diamine(s) containing X carbon atoms;
of the dicarboxylic acid(s) containing Y carbon atoms; and
of the comonomer(s) {Z}, chosen from lactams and α,ω-aminocarboxylic acids containing Z carbon atoms and equimolar mixtures of at least one diamine containing X1 carbon atoms and of at least one dicarboxylic acid containing Y1 carbon atoms, (X1, Y1) being different from (X, Y);
said comonomer(s) {Z} being introduced in a weight proportion ranging up to 50%, preferably up to 20%, even more advantageously up to 10% relative to the total amount of polyamide-precursor monomers;

in the presence of a chain limiter chosen from dicarboxylic acids.

Advantageously, the dicarboxylic acid containing Y carbon atoms is used as chain limiter, which is introduced in excess relative to the stoichiometry of the diamine(s).

According to one variant of this third type, the polyamide blocks result from the condensation of at least two α,ω-aminocarboxylic acids or from at least two lactams containing from 6 to 12 carbon atoms or from one lactam and one aminocarboxylic acid not having the same number of carbon atoms, in the optional presence of a chain limiter. As examples of aliphatic α,ω-aminocarboxylic acids, mention may be made of aminocaproic acid, 7-aminoheptanoic acid, 11-aminoundecanoic acid and 12-aminododecanoic acid. As examples of lactams, mention may be made of caprolactam, oenantholactam and lauryllactam. As examples of aliphatic diamines, mention may be made of hexamethylenediamine, dodecamethylenediamine and trimethylhexamethylenediamine. An example of a cycloaliphatic diacid that may be mentioned is 1,4-cyclohexyldicarboxylic acid. As examples of aliphatic diacids, mention may be made of butanedioic acid, adipic acid, azelaic acid, suberic acid, sebacic acid, dodecanedicarboxylic acid, dimerized fatty acids (these dimerized fatty acids preferably have a dimer content of at least 98%; they are preferably hydrogenated; they are sold under the brand name Pripol® by the company Unichema, or under the brand name Empol® by the company Henkel) and α,ω-diacid polyoxyalkylenes. As examples of aromatic diacids, mention may be made of terephthalic acid (T) and isophthalic acid (I). As examples of cycloaliphatic diamines, mention may be made of bis(4-aminocyclohexyl)methane (BACM), bis(3-methyl-4-aminocyclohexyl)methane (BMACM), 2-2-bis(3-methyl-4-aminocyclohexyl)propane (BMACP) and para-aminodicyclohexylmethane (PACM) isomers. The other diamines commonly used may be isophoronediamine (IPDA), 2,6-bis(aminomethyl)norbornane (BAMN) and piperazine.

In the case where the PA blocks of the PEBA according to the invention comprise at least two different monomers, called "comonomers", i.e. at least one monomer and at least one comonomer (monomer other than the first monomer), they comprise a copolymer, such as a copolyamide, abbreviated as CoPA.

As examples of polyamide blocks of the third type, mention may be made of the following:
  66/6 in which 66 denotes hexamethylenediamine units condensed with adipic acid. 6 denotes units resulting from the condensation of caprolactam.
  66/610/11/12 in which 66 denotes hexamethylenediamine condensed with adipic acid. 610 denotes hexamethylenediamine condensed with sebacic acid. 11 denotes units resulting from the condensation of aminoundecanoic acid. 12 denotes units resulting from the condensation of lauryllactam.

The molar mass Mn of the flexible blocks is between 100 and 6000 g/mol and preferably between 200 and 3000 g/mol.

Preferably, the polymer comprises from 1% to 80% by mass of flexible blocks and from 20% to 99% by mass of polyamide blocks, preferably from 4% to 80% by mass of flexible blocks and from 20% to 96% by mass of polyamide blocks.

According to a preferred embodiment, the rigid polyamide block, in the copolymer containing rigid PA blocks and flexible blocks according to the invention, comprises at least one of the following polyamide units: 11, 12, 6, 610, 612, 1010, 1012, and mixtures or copolyamides thereof.

The polyether blocks PE are predominantly (i.e. to more than 50% by weight relative to the weight of the polyether blocks) polyoxyalkylene blocks bearing diamine chain ends, obtained by cyanoethylation and hydrogenation of aliphatic α,ω-dihydroxylated polyoxyalkylene blocks known as polyetherdiols and consisting of alkylene oxide units. These units may be, for example, ethylene oxide units, propylene oxide units or tetrahydrofuran (which leads to polytetramethylene glycol sequences). Use is thus made of PEG (polyethylene glycol) blocks, i.e. blocks formed from ethylene oxide units, PPG (propylene glycol) blocks, i.e. blocks formed from propylene oxide units, PO3G (polytrimethylene glycol) blocks, i.e. blocks formed from polytrimethylene glycol ether units (such copolymers with polytrimethylene ether blocks are described in document U.S. Pat. No. 6,590,065), and PTMG blocks, i.e. blocks formed from tetramethylene glycol units, also known as polytetrahydrofuran. The PEBA copolymers may comprise in their chain several types of polyethers, the copolyethers possibly being in block or statistical form.

Use may also be made of blocks obtained by oxyethylation of bisphenols, for instance bisphenol A. The latter products are described in patent EP 613 919.

The polyether blocks may also be formed from ethoxylated primary amines. As examples of ethoxylated primary amines, mention may be made of the products of formula:

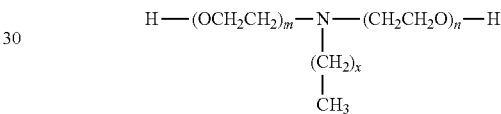

in which m and n are between 1 and 20 and x is between 8 and 18. These products are commercially available under the brand name Noramox® from the company CECA and under the brand name Genamin® from the company Clariant.

The flexible polyether blocks comprising polyoxyalkylene blocks bearing $NH_2$ chain ends may be obtained by cyanoacetylation of α,ω-dihydroxylated aliphatic polyoxyalkylene blocks referred to as polyetherdiols. Use may also be made of polyoxyalkylene blocks bearing $NH_2$ chain ends sold under the name Jeffamine® (for example Jeffamine® D400, D2000, ED 2003, XTJ 542, which are commercial products from the company Huntsman, also described in patents JP2004346274, JP2004352794 and EP1482011). Other polyether diamines are sold under the names Baxxodur® from BASF, and Elastamine® from Huntsman.

The polyetherdiol blocks, whether they are used in unmodified form and copolycondensed with polyamide blocks bearing carboxylic end groups, or else aminated to be transformed into polyether diamines and condensed with polyamide blocks bearing carboxylic end groups, the general method for the two-step preparation of PEBA copolymers is substantially the same, and forms ester and amide bonds, respectively, between the PA blocks and the PE blocks. This method is known and described, for example, in French patent FR 2 846 332. The general method for the preparation of the PEBA copolymers of the invention containing amide bonds between the PA blocks and the PE blocks is known and described, for example, in European patent EP1482011. The polyether blocks may also be mixed with polyamide precursors and a chain-limiting diacid to make polymers containing polyamide blocks and polyether blocks having randomly distributed units (one-step process).

Needless to say, the name PEBA in the present description of the invention relates not only to the Pebax® products sold by Arkema, to the Vestamid® products sold by Evonik® and to the Grilamid® products sold by EMS, but also to the Kellaflex® products sold by DSM or to any other PEBA from other suppliers.

Advantageously, the PEBA copolymers contain PA blocks as PA 6, as PA 11, as PA 12, PA 612, as PA 66/6, as PA 1010 and/or as PA 614, preferably PA 11 and/or PA 12 blocks; and PE blocks as PTMG, as PPG, PEG and/or as PO3G. The PEBAs based on PE blocks predominantly consisting of PEG are to be categorized in the range of hydrophilic PEBAs. The PEBAs based on PE blocks predominantly consisting of PTMG are to be categorized in the range of hydrophobic PEBAs.

Advantageously, said PEBA used in the composition according to the invention is at least partially obtained from biobased raw materials.

The term "raw materials of renewable origin" or "biobased raw materials" means materials which comprise biobased carbon or carbon of renewable origin. Specifically, unlike materials derived from fossil materials, materials composed of renewable raw materials contain $^{14}C$. The "content of carbon of renewable origin" or "content of biobased carbon" is determined by application of the standards ASTM D 6866 (ASTM D 6866-06) and ASTM D 7026 (ASTM D 7026-04). By way of example, the PEBAs based on polyamide 11 at least partly originate from biobased raw materials and have a content of biobased carbon of at least 1%, which corresponds to a $^{12}C/^{14}C$ isotope ratio of at least $1.2 \times 10^{-14}$. Preferably, the PEBAs according to the invention comprise at least 50% by mass of biobased carbon relative to the total mass of carbon, which corresponds to a $^{12}C/^{14}C$ isotope ratio of at least $0.6 \times 10^{-12}$. This content is advantageously higher, notably up to 100%, which corresponds to a $^{12}C/^{14}C$ isotope ratio of $1.2 \times 10^{-12}$, in the case, for example, of PEBA containing PA 11 blocks and PE blocks comprising PO3G, PTMG and/or PPG derived from raw materials of renewable origin.

For the purposes of the invention, the term polysiloxane block (abbreviated hereinbelow as PSi) means any organosilicon polymer or oligomer of linear or cyclic, branched or crosslinked structure, obtained by polymerization of functionalized silanes, and consisting essentially of a repetition of main units in which silicon atoms are linked together via oxygen atoms (siloxane bond —Si—O—Si—), optionally substituted hydrocarbon-based radicals being directly linked via a carbon atom to said silicon atoms. The most common hydrocarbon-based radicals are alkyl radicals, notably of C1-C10 and in particular methyl, fluoroalkyl radicals, aryl radicals and in particular phenyl, and alkenyl radicals and in particular vinyl; other types of radicals that may be bonded, either directly or via a hydrocarbon-based radical, to the siloxane chain are notably hydrogen, halogens and in particular chlorine, bromine or fluorine, thiols, alkoxy radicals, polyoxyalkylene (or polyether) radicals and in particular polyoxyethylene and/or polyoxypropylene, hydroxyl or hydroxyalkyl radicals, substituted or unsubstituted amine groups, amide groups, acyloxy or acyloxyalkyl radicals, hydroxyalkylamino or aminoalkyl radicals, quaternary ammonium groups, amphoteric or betaine groups, anionic groups such as carboxylates, thioglycolates, sulfosuccinates, thiosulfates, phosphates and sulfates, and mixtures thereof, this list obviously not being in any way limiting ("organomodified" silicones).

Preferably, said polysiloxane blocks comprise polydimethylsiloxane (abbreviated hereinbelow as PDMS blocks), polymethylphenylsiloxane and/or polyvinylsiloxane.

For the purposes of the invention, the term polyolefin block (abbreviated hereinbelow as PO block) means any polymer comprising an α-olefin as monomer, i.e. homopolymers of an olefin or copolymers of at least one α-olefin and of at least one other copolymerizable monomer, the α-olefin advantageously containing from 2 to 30 carbon atoms.

As examples of α-olefins, mention may be made of ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene and 1-triacontene. These α-olefins may be used alone or as a mixture of two or of more than two.

Examples that may be mentioned include:
  ethylene homopolymers and copolymers, in particular low-density polyethylene (LDPE), high-density polyethylene (HDPE), linear low-density polyethylene (LLDPE), very-low-density polyethylene (VLDPE) and polyethylene obtained by metallocene catalysis,
  propylene homopolymers and copolymers,
  essentially amorphous or atactic poly-α-olefins (APAO),
  ethylene/α-olefin copolymers such as ethylene/propylene, EPR (ethylene-propylene-rubber) elastomers and EPDM (ethylene-propylene-diene) elastomers, and mixtures of polyethylene with an EPR or an EPDM,
  styrene/ethylene-butene/styrene (SEBS), styrene/butadiene/styrene (SBS), styrene/isoprene/styrene (SIS) and styrene/ethylene-propylene/styrene (SEPS) block copolymers,
  copolymers of ethylene with at least one product chosen from salts or esters of unsaturated carboxylic acids, for instance alkyl (meth)acrylates, the alkyl possibly containing up to 24 carbon atoms, vinyl esters of saturated carboxylic acids, for instance vinyl acetate or propionate, and dienes, for instance 1,4-hexadiene or polybutadiene.

According to an advantageous embodiment of the invention, said at least one polyolefin block comprises polyisobutylene and/or polybutadiene.

According to yet another embodiment, said at least one polyolefin block is manufactured from low molecular weight hydroxy-terminated diol(s) based on butadiene homopolymers. Hydroxy-terminated polybutadiene (HTPB) resins are notably sold under the name Krasol®, and are characterized by excellent hydrophobicity and a highly reactive functionality.

According to a particularly advantageous embodiment, the block copolymer according to the invention includes at least one flexible polyolefin block (PO block) and at least one hard hydrophilic block (abbreviated hereinbelow as hHB) comprising both polyamide and polyether, such as a polyetheramide block and/or a polyetheramideimide block, etc. Said PO block preferably comprises a polyolefin including acid or better still amine end groups. Preferably, the PO block is obtained by thermal degradation of high molecular weight polyolefins to form polyolefins of lower mass and functionalized (reference method: Japanese Kokai Publication Hei-03-62804). As regards the hHB block, it may also comprise at least one polymer chosen from: cationic polymers of quaternary amine type and/or phosphorus derivatives; and/or anionic polymers, of modified diacid type, including a sulfonate group and which are capable of reacting with a polyol. The addition of organic salt may then be envisaged in the preparation of the hHB block or during the reaction between the PO block and the hHB block. Document U.S. Pat. No. 6,552,131 describes the synthesis and the various possible structures for the copolymer containing PO blocks and hHB blocks, it being possible, needless to say, for the latter to be envisaged in the process according to the invention.

If the block copolymers described above generally comprise at least one rigid polyamide block and at least one flexible block, it is obvious that the present invention in fact covers all the copolymers comprising two, three, four (or even more) different blocks chosen from those described in the present description, provided that at least one of these blocks is a polyamide block.

Advantageously, the weight ratio of the PA blocks to the flexible blocks is within the range from 1 to 10, preferably from 1.5 to 6, preferably from 1.7 to 5.

A subject of the present invention is also the use of a flexible block for manufacturing a copolymer containing polyamide blocks and flexible blocks that is both hydrolysis-resistant and $CO_2$-permeable, with a permeability to $CO_2$ of at least 10 000 $cm^3/m^2/24$ h/atm for a 25 μm film of said copolymer, characterized in that said flexible block has a ratio of amine chain ends to acid or alcohol chain ends which is within the range from 30 to 150.

A subject of the present invention is also a copolymer-based composition according to the invention, characterized in that it comprises:
 from 51% to 99.9% by weight of said copolymer.
 from 0.1% to 49% by weight of at least one other component chosen from polyamides, functional polyolefins, copolymers of ethylene and vinyl acetate, copolymers of ethylene and of acrylate, and copolymers of ethylene and of alkyl (meth)acrylate,
 and/or
 from 0.1% to 10% by weight of additives chosen from nucleating agents, fillers, notably mineral fillers, such as talc, reinforcing fibers, notably glass or carbon fibers, dyes, UV absorbers, antioxidants, notably phenolic or phosphorus-based or sulfur-based antioxidants, hindered-amine light stabilizers (HALS), and mixtures thereof,
 relative to the total weight of the composition.

A subject of the present invention is also a fashioned article, such as a fiber, fabric, film, sheet, rod, tube, injection-molded and/or extruded component, comprising a copolymer or a composition according to the invention.

Preferably, this article constitutes at least a part of one of the following articles: sports article, shoe component, sports shoe component, shoe sole, notably studs, ski component, notably ski boot or ski boot shell, sports tool such as ice skates, ski attachments, rackets, sports bats, boards, horseshoes, protective leggings, flippers, golf balls, leisure articles, DIY articles, road maintenance tool or equipment, protective equipment or article, such as helmet visors, goggles, goggle arms, motor vehicle part, car component such as dashboard, airbag, headlamp protector, rearview mirror, small part for off-road vehicles, tank, in particular for scooters, mopeds or motorbikes, industrial component, industrial additive, electrical, electronic, information technology, tablet computer, telephone or computer component, safety accessory, shop sign, lighting strip, information and publicity panel, presentation case, engraving, furnishing, shopfitting, decoration, contact ball, medical device, dental prosthesis, implant, ophthalmology article, hemodialysis machine membrane, optical fibers, art object, sculpture, photography camera lens, disposable photography camera lens, printing support, notably support for direct printing with UV inks, for photography table, window, sunroof, transmission belt, notably in the motor vehicle industry, the wood industry or the textile industry, antistatic additive, waterproof breathable product or film, active molecule support, colorant, welding agent, decorative element, and/or polyamide additive, rail sole, pushchair component, wheel, handle, seat component, childhood car seat component, construction component, audio equipment, acoustic insulation and/or heat insulation component, component for absorbing impacts and/or vibrations, such as those generated by a means of transport, smooth-riding wheels such as a tire, textile, woven or nonwoven, wrapping, peristaltic belt, conveyor belt, synthetic skin and/or leather, hose component, notably of a flexible sheath, in the oil and gas industry, in particular in offshore applications, any applications requiring a material that is both hydrolysis-resistant and $CO_2$-permeable, and any article comprising a mixture of these articles.

EXAMPLES

The examples that follow illustrate the invention without limiting it. The standards used in the examples also correspond to those used more generally for characterizing the invention in the description or the claims.

Materials Used:

TABLE 1

Nature of the flexible blocks used and their ratio of $NH_2$/OH chain ends

| Name | Nature of the flexible block | Mn (g/mol) potentio-metry | Concentration of chain ends $^1$H NMR (TFanh./$CD_2Cl_2^3$) | | $NH_2$/OH ratio |
|---|---|---|---|---|---|
| | | | NH2 (meq./g) | OH (meq./g) | |
| PEcp1 | PPG | 2086 | 0.929 | 0.079 | 11.76 |
| PEex1 | PPG | 467 | 4.58 | 0.13 | 35.23 |
| PEcp2 | PPG | 2172 | 0.86 | 0.08 | 10.75 |
| PEex2 | PPG/PTMG/PPG | 1090 | 1.87 | 0.05 | 37.40 |

In Table 2 below, only PEBA6 is based on PE (PTMG) bearing purely alcohol chain ends (PEdiOH). The other PEBAs are based on PE bearing predominantly amine chain ends, and contain a small concentration of alcohol chain ends: their corresponding $NH_2$/OH ratio is indicated in table 1 above.

TABLE 2

Nature of the PEBAs compared in the tests

| Test | PA nature | PE nature | Mn PA g/mol | Mn PE g/mol | PA/PE |
|---|---|---|---|---|---|
| PEBA1 cp1 | 12 | PPG | 4500 | 2086 | 2.15 |
| PEB A2 ex2 | 12 | PPG/PTMG/PPG | 3883 | 1090 | 3.56 |
| PEB A3 ex1 | 12 | PPG | 800 | 467 | 1.71 |
| PEB A4 ex2 | 12 | PPG/PTMG/PPG | 2000 | 1090 | 1.83 |
| PEB A5 ex1 | 12 | PPG | 800 | 467 | 1.7 |
| PEB A6 cp3 | 12 | PTMG (diOH) | 2000 | 1000 | 2 |

TABLE 2-continued

Nature of the PEBAs compared in the tests

| Test | PA nature | PE nature | Mn PA g/mol | Mn PE g/mol | PA/PE |
|---|---|---|---|---|---|
| PEB A7 ex1 | 11 | PPG | 1720 | 430 | 4 |

Hydrolysis Resistance Tests

The PEBA granules are contained in a metal cage which is placed at the bottom of the autoclave. The autoclave is then filled with 1.4 L of water at pH 7, closed and inertized by flushing with nitrogen for 3 hours. The autoclave is then placed in an oven heated to 110° C. The hydrolysis is rapid, and the tests have a duration of from 25 to 30 days.

In the examples, as in the description of the present invention:

the inherent viscosity is determined according to the standard ISO 307: 2007 in m-cresol at a temperature of 20° C.;

the tensile stress at 23° C. and the elongation at break are determined according to the standard ISO 527 1A: 2012;

the permeation or permeability to $CO_2$ is measured according to the procedure described below.

PEBA6 cp3 has low resistance to hydrolysis compared with that of PA 11. PEBA6 cp3 reaches a viscosity of 0.3 at the end of hydrolysis with a percentage loss of viscosity of 75%. The viscosity of PA11 remains stable during the hydrolysis and its percentage loss of viscosity is only 12%.

The three PEBAs synthesized from polyether predominantly bearing diamine chain ends are more resistant to hydrolysis than PEBA6 cp3. PEBA4 ex2 has a resistance to hydrolysis higher than that of PA11. The viscosity of PEBA5 ex1 decreases slightly, whereas that of PEBA1 cp1 decreases slightly more at the start of the hydrolysis.

The use of flexible blocks with an $NH_2/OH$ ratio of greater than 30 in the block copolymer markedly improves the resistance to hydrolysis of the copolymer.

Mechanical Tests During the Hydrolysis:

Dumbbells of the various products are subjected to aging in water. The hydrolysis is performed in a closed autoclave at 110° C. Samples are taken and the hydrolyzed dumbbells are subjected to tensile tests in order to study the elongation at break after hydrolysis.

In order to determine the mechanical characterization of the dumbbells, before and after hydrolysis, under the same conditions, it is necessary for the dumbbells at T0 to be saturated with water. The dumbbells are thus immersed in water for 119 hours at room temperature.

After saturating the dumbbells with water, they are rapidly dried with adsorbent paper and then subjected to the tensile tests.

The results regarding the breaking stress ($\sigma$rupt), the elongation at break ($\varepsilon$rupt) and the inherent viscosity (Inh. visco) as a function of the hydrolysis time are indicated in table 4 below.

TABLE 4

Results of the tensile tests in the course of the hydrolysis

| | | PEBA6 cp3 | | | PEBA4 ex2 | | | PEBA5 ex1 | | |
|---|---|---|---|---|---|---|---|---|---|---|
| Sample | Hydrolysis time (hours) | Mean σrupt (MPa) | Mean εru | Inh. viscosity | Mean σrupt (MPa) | Mean εru | Inh. viscosity | Mean σrupt (MPa) | Mean εrupt (%) | Inh. viscosity |
| T0 | 0 | 38.2 | 470 | 1.34 | 38.9 | 381.57 | 1.67 | 28.00 | 426.64 | 0.95 |
| P1 | 91 | 39.6 | 375 | 0.87 | 24.4 | 406.7 | 1.44 | 27.58 | 359.8 | 0.87 |
| P2 | 182 | 11.56 | 14 | 0.62 | 39.6 | 383.5 | 1.44 | 28.2 | 380.1 | 0.85 |
| P3 | 417 | — | — | 0.33 | 40.0 | 389.8 | 1.4 | 27.8 | 363.1 | 0.86 |
| P4 | 483 | — | — | 0.33 | 41.3 | 377.6 | 1.39 | 29.9 | 366.4 | 0.86 |
| P5 | 678 | — | — | 0.29 | 38.2 | 389.5 | 1.34 | 27.3 | 364.5 | 0.84 |

Change in the Inherent Viscosity in the Course of the Hydrolysis:

In table 3 below, the results for the hydrolysis of PEBA6 cp3 base PTMGdiOH are compared with those for the PEBAs synthesized from flexible blocks predominantly bearing $NH_2$ chain ends. An industrial PA 11 is added as reference and enables comparison of the resistance to hydrolysis of the PEBAs with that of a PA.

TABLE 3

Inherent viscosity of the samples in the course of the hydrolysis

| | Inherent viscosity | | |
|---|---|---|---|
| Samples | Initial | At the end of | Percentage loss (%) |
| PAH | 1.4 | 1.23 | 12 |
| PEBA6 cp3 | 1.34 | 0.33 | 75 |
| PEBA1 cp1 | 1.06 | 0.72 | 32 |
| PEBA4 ex2 | 1.42 | 1.3 | 8 |
| PEBA5 ex1 | 1.25 | 0.94 | 25 |

The graph of FIG. 1 shows the change in the elongation at break of these various PEBAs as a function of the hydrolysis time.

PEBA6 cp3 degrades rapidly. After 182 hours of hydrolysis, the elongation at break is 14%. After about 400 hours of hydrolysis, it is impossible to perform tensile tests on the PEBA6 cp3 dumbbells, which break up.

In contrast, the elongations at break of the two PEBAs according to the invention, PEBA4 ex2 and PEBA5 ex1, stabilize after hydrolysis. Thus, PEBA4 ex2 has an elongation at break of about 380% for a stress of 40 MPa before and after hydrolysis. As for PEBA5 ex1, it has an elongation at break of 420% for a stress of 28 MPa before hydrolysis, then the elongation at break stabilizes at 360% for a stress of about 28 MPa after hydrolysis.

Tests of Permeability (or Permeation) to $CO_2$

Procedure for Measuring the Permeation to Gases:

The permeability of a material is defined by the stream passing through a membrane of thickness "e" via the relationship:

$$\frac{\text{Amount} \times e}{\text{Area} \times \text{time} \, (p_2 - p_1)}$$

where $p_2$ and $p_1$ are the partial pressures on either side of the membrane.

The permeability coefficient (flux) is measured:

$$\frac{\text{Amount}}{\text{Area} \times \text{time}}$$

Figure 2:
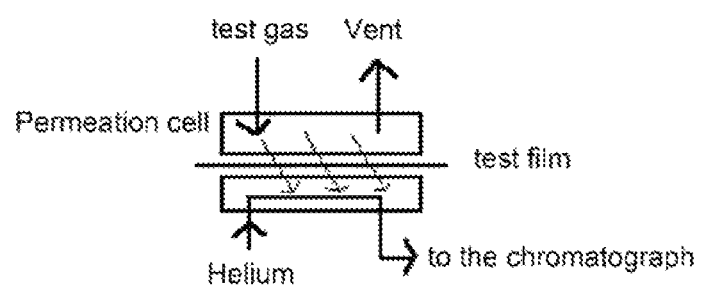
FIG. 2 depicts the principle behind the procedure for measuring the permeation to gases of the block copolymer films.

Principle:

FIG. 2 depicts the principle of the permeability test, which consist of flushing the upper face of the film with the test gas and measuring by gas chromatography the stream which diffuses through the film in the lower part, flushed by the vector gas: helium.

All the PEBAs tested above, the flexible block of which has an $NH_2/OH$ ratio of concentrations of amine chain ends to alcohol chain ends that is within the range from 30 to 150, according to the invention, have a permeability to $CO_2$ of at least 10 000 $cm^3/m^2/24$ h/atm for a 25 μm film of said copolymer.

It turns out that the PEBAs whose flexible block has an $NH_2/OH$ ratio of less than 30 have, on the other hand, a permeability of less than 10 000 $cm^3/m^2/24$ h/atm for a 25 μm film of said copolymer.

In summary, the present invention provides a block copolymer that is readily extrudable even into large-diameter tubes, having an elongation at break of greater than 350% according to the standard ISO 527 1A: 2012, and a stable inherent viscosity, which does not decrease by more than 25% even when said copolymer is subjected to extreme hydrolysis conditions, for example in seawater, or in a tropical or very humid climate.

The invention claimed is:

1. A block copolymer comprising rigid polyamide blocks and flexible blocks, wherein the flexible blocks have an $NH_2/OH$ ratio of concentrations of amine chain ends to alcohol chain ends which is within the range of 30 to 150, said concentrations being measured by $^1H$ NMR ($TF_{anh}$/$CD_2Cl_2$).

2. The block copolymer as claimed in claim 1, wherein said $NH_2/OH$ ratio is within the range of 30 to 100.

3. The block copolymer as claimed in claim 1, wherein said flexible blocks comprise at least one block chosen from: polyether, polydimethylsiloxane, polyolefin, and mixtures or copolymers thereof.

4. The block copolymer as claimed in claim 1, wherein said flexible blocks comprise at least one polyether PE chosen from PTMG, PPG, PO3G and/or PEG.

5. The block copolymer as claimed in claim 1, wherein said polyamide (PA) blocks comprise at least one of the following polyamide units: 11, 12, 6, 610, 612, 1010, 1012, and mixtures or copolyamides thereof.

6. The block copolymer as claimed in claim 1, wherein the weight ratio of the PA blocks to the flexible blocks is within the range of 1 to 10.

7. The block copolymer of claim 1, wherein said block copolymer contains polyamide blocks and flexible blocks and is both hydrolysis-resistant and $CO_2$-permeable, with a permeability to $CO_2$ of at least 10,000 $cm^3/m^2/24$ h/atm for a 25 μm film of said copolymer, wherein said flexible blocks have a ratio of amine chain ends to alcohol chain ends which is within the range of 30 to 150.

8. A fashioned article comprising the block copolymer of claim 1, wherein said article is selected from the group consisting of a fiber, fabric, film, sheet, rod, tube, and an injection-molded and/or extruded part.

9. The fashioned article as claimed in claim 8, wherein said fashioned article constitutes at least a part of an article selected from the group consisting of a sports article, shoe component, sports shoe component, shoe sole, studs, ski component, ski boot or ski boot shell, sports tool, ice skates, ski attachments, rackets, sports bats, boards, horseshoes, protective leggings, flippers, golf balls, leisure articles, DIY articles, road maintenance tool or equipment, protective equipment or article, helmet visors, goggles, goggle arms, motor vehicle part, car component, dashboard, airbag, headlamp protector, rearview mirror, small part for off-road vehicles, scooter tank, moped tank, motorbike tank industrial component, industrial additive, electrical, electronic, information technology, tablet computer, telephone or computer component, safety accessory, shop sign, lighting strip, information and publicity panel, presentation case, engraving, furnishing, shopfitting, decoration, contact ball, medical device, dental prosthesis, implant, ophthalmology article, hemodialysis machine membrane, optical fibers, art object, sculpture, photography camera lens, disposable photography camera lens, printing support, support for direct printing with UV inks, photography table, window, sunroof, transmission belt, wood industry belt, textile industry belt, antistatic additive, waterproof breathable product or film, active molecule support, colorant, welding agent, decorative element, polyamide additive, rail sole, pushchair component, wheel, handle, seat component, childhood car seat component, construction component, audio equipment, acoustic insulation, heat insulation component, component for absorbing impacts and/or vibrations, transport, smooth-riding wheels, tire, textile, woven or nonwoven, wrapping, peristaltic belt, conveyor belt, synthetic skin, synthetic leather, hose component, flexible sheath, oil and gas industry article, offshore applications, any applications requiring a material that is both hydrolysis-resistant and $CO_2$-permeable, and any article comprising a mixture of these articles.

10. The copolymer as claimed in claim 2, wherein said $NH_2/OH$ ratio is within the range of 30 to 89.

11. The copolymer as claimed in claim 1, wherein said $NH_2/OH$ ratio is within the range of 30 to 60.

12. The copolymer as claimed in claim 6, wherein the weight ratio of the PA blocks to the flexible blocks is within the range of 1.5 to 6.

13. The copolymer as claimed in claim 6, wherein the weight ratio of the PA blocks to the flexible blocks is within the range of 1.7 to 5.

* * * * *